Jan. 23, 1962

G. MOUNTJOY 3,018,368

SPEED CONTROL SYSTEM UTILIZING FREQUENCY
CHANGE FROM INDUCTIVE PICKUP

Filed May 6, 1959

INVENTOR.
Garrard Mountjoy
BY
Hugh L. Fisher
ATTORNEY

Jan. 23, 1962  G. MOUNTJOY  3,018,368
SPEED CONTROL SYSTEM UTILIZING FREQUENCY
CHANGE FROM INDUCTIVE PICKUP
Filed May 6, 1959  3 Sheets-Sheet 2

INVENTOR.
Garrard Mountjoy
BY
Hugh L. Fisher
ATTORNEY

$I_{T_{34}}$　　Fig. 9
$I_{T_{52}}$　　Fig. 10
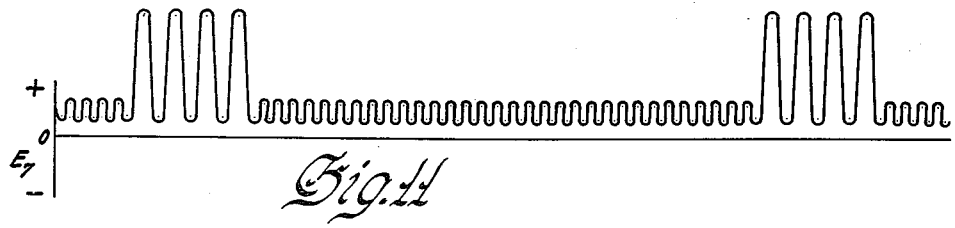
$E_7$　　Fig. 11
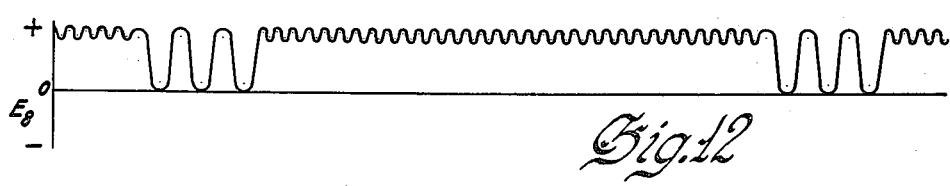
$E_8$　　Fig. 12
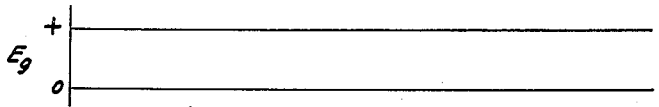
$E_9$　　Fig. 13
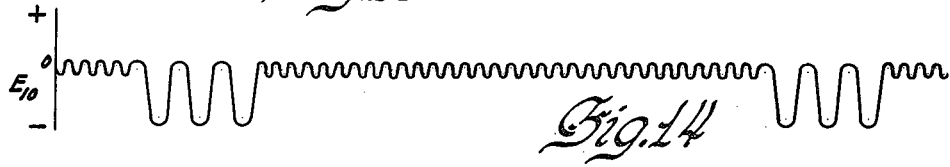
$E_{10}$　　Fig. 14
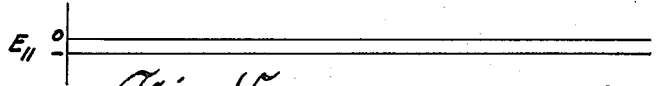
$E_{11}$　　Fig. 15

United States Patent Office 3,018,368
Patented Jan. 23, 1962

3,018,368
SPEED CONTROL SYSTEM UTILIZING FREQUENCY CHANGE FROM INDUCTIVE PICKUP
Garrard Mountjoy, Little Rock, Ark., assignor to General Motors Corporation, Detroit, Mich., a corporation of Delaware
Filed May 6, 1959, Ser. No. 811,490
14 Claims. (Cl. 246—182)

This invention relates to speed control systems and particularly to speed control systems of a character that are adapted, although not exclusively, for controlling the speed of a vehicle along a predetermined path or roadway.

Occasions arise when it is desirable because of changing conditions, such as rain, traffic congestion, etc., or for any other reason, to limit and/or maintain by external means the speed of a vehicle over a certain extent of roadway. To accomplish such speed control externally or by means separate from the vehicle, inherently presents a problem of communication in some simple and convenient way.

Accordingly, the invention contemplates a vehicle speed control system that utilizes a novel roadway arrangement along with unique vehicle carried apparatus so as to maintain vehicle road speed at a selected level.

Somewhat more specifically stated, the invention by the foregoing system affords a roadway having plural electrical conductors arranged so as to produce one magnetic field having zones of varying flux density and another magnetic field having a predetermined command frequency. Pickups carried by a vehicle and coacting with these fields have induced therein command speed and road speed signal voltages that are utilized to develop an output for actuating a vehicle control, e.g., a throttle, and thereby alter control settings as needed to cause road speed to be in some predetermined proportion to command speed.

In carrying out the invention, according to one form thereof, a roadway is provided along the path of movement of a vehicle with plural sources of alternating current; one produces a keyed command frequency for establishing a selected vehicle command speed and the other provides zones of varying density for determining vehicle road speed. The vehicle is provided with pickups that coact with the command speed and road speed signals so as to have induced therein respectively a command speed signal voltage and a road speed signal voltage. These two signal voltages are then demodulated and supplied to an amplifying circuit having first and second amplifying devices. When the command signal voltage is on, the D.C. component thereof is utilized to bias the first amplifying device beyond cutoff, while the A.C. component of the command speed signal voltage is delivered to the second amplifying device so as to produce an amplified command speed signal voltage. When the command signal voltage is off, the first amplifying device is conductive and will combine with the second amplifying device to produce an amplified road speed signal voltage. These two signal voltages from the amplifying circuit are transferred through a frequency responsive network so that the amplitudes thereof correspond to frequency and then are delivered to clamping circuits of opposite polarity, one affording a reference level or potential for the other with the result that a D.C. output voltage is produced that indicates whether the vehicle is going faster or slower than the selected command speed. The D.C. voltage so developed operates a throttle actuating servo and accordingly increases or decreases the throttle setting so as to cause road speed to be in some predetermined proportion to the command speed.

The foregoing and other objects and advantages of the invention will be apparent from the foregoing description and the accompanying drawings in which:

FIGURES 3 through 15 show different graphs illustrating wave forms produced at designated parts of the circuit diagram with the ordinates corresponding either to voltage or current as specified, and the abscissas to time.

Figure 1:
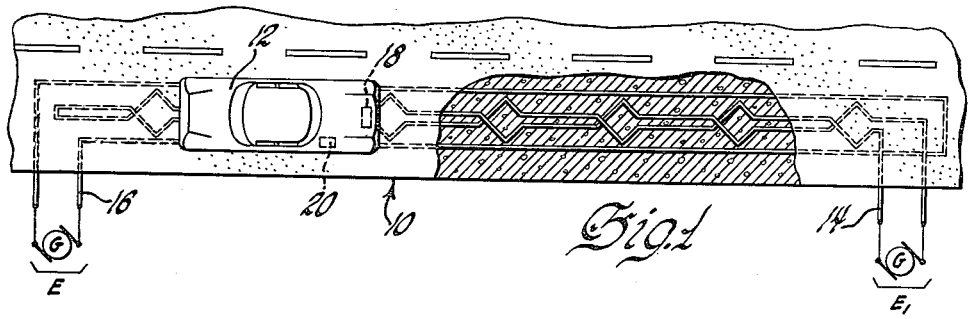
FIGURE 1 depicts a vehicle and a roadway therefor that incorporates the principles of the invention.
Figure 3:

Referring first to FIGURE 1, the numeral 10 denotes generally a roadway for a vehicle 12. The roadway 10 has embedded therein electrical conductors such as a road speed cable 14 of a criss-cross configuration and a command speed cable 16, both extending along the path of movement for the vehicle 12. The command speed cable 16 and the road speed cable 14 are each furnished with alternating currents respectively from generating sources designated generally at E and $E_1$ so as to produce corresponding magnetic fields above the roadway 10. The wave form of $E_1$ is illustrated in FIGURE 3 and may be of some suitable frequency such as 5000 c.p.s., whereas the generating source E produces a keyed on and off command signal modulated at a frequency corresponding to a selected reference or command speed, for instance 60 m.p.h. Any suitable provision may be made for varying this command signal frequency by adjustment of the source E so as to permit the command speed to be altered for different driving conditions along selected sections of the roadway 10. The placement and the number of sources E will be determined by the environment and the type of roadway. As will be explained, movement of the vehicle 12 along the cables 14 and 16 will result in the production of a road speed signal voltage and a command speed signal voltage. These two signal voltages then are utilized in actuating the vehicle throttle so as to cause the vehicle 12 to move at command speed. In other words, if the vehicle 12 is going faster than command speed, the throttle setting is reduced; and if the vehicle 12 is going slower than command speed, the throttle setting is increased.

Figure 2:
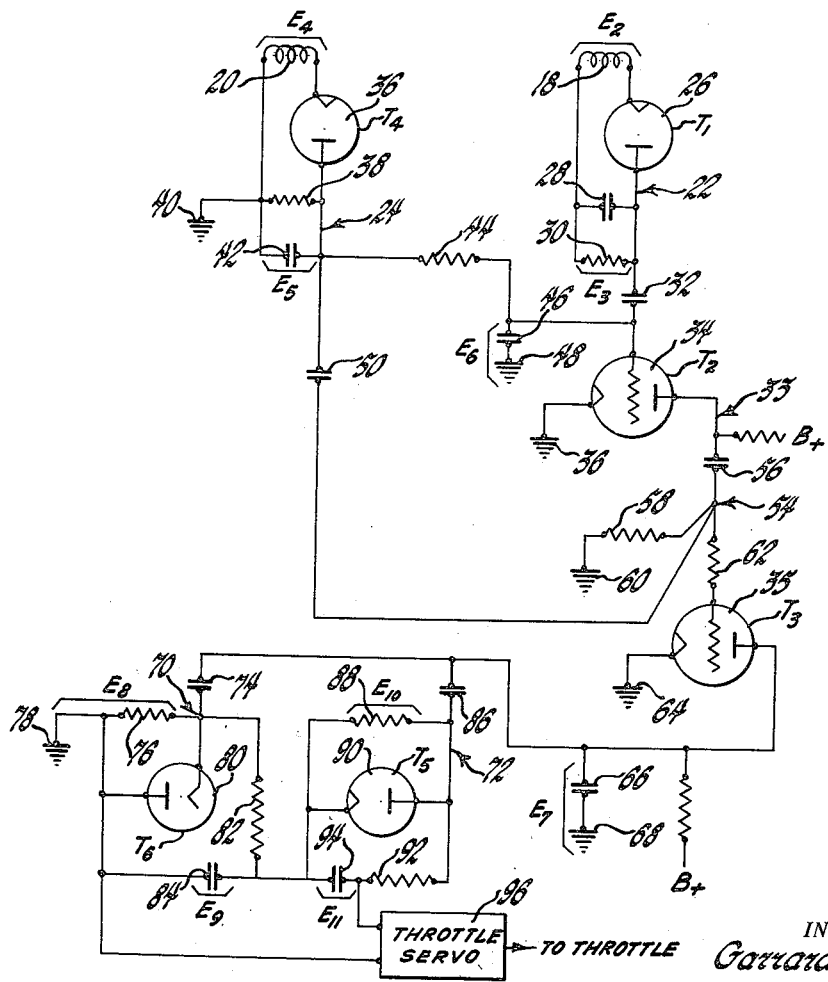
FIGURE 2 is a circuit diagram of the electronic controls carried by the vehicle.
Figure 4:
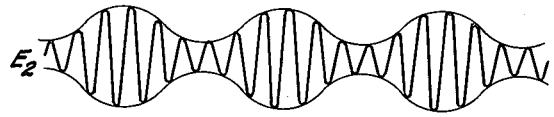
Figure 6:
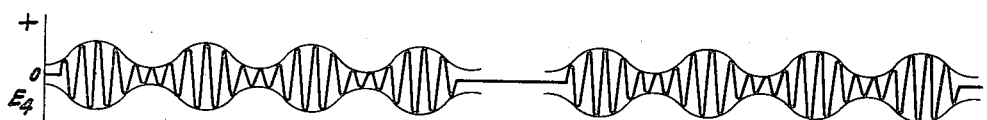

For producing the signal voltages the vehicle 12 has installed thereon as illustrated in FIGURE 2, a road speed pickup winding 18 and a command speed pickup winding 20 respectively positioned adjacent the road speed cable 14 and the command speed cable 16. The magnetic field above the road speed cable 14, because of the criss-cross shape, will have zones of varying flux density, i.e., at the criss-cross the zones will have decreased intensity. As the vehicle 12 traverses the roadway 10, the road speed winding 18 will have a signal voltage induced therein modulated so as to have a frequency corresponding to the rate at which the winding 18 passes through the zones and a wave form something like that shown in FIGURE 4 will result. The command signal voltage induced in the winding 20 and denoted at $E_4$ will have the form depicted in FIGURE 6. The keying of the generating source E may be, for example and without limitation, such that the field is on four units of time, and off one unit of time. As a result, the command speed signal voltage at $E_4$ will exist only during the four units of time.

Figure 5:

Both the road speed signal voltage and the command speed signal voltage are rectified or demodulated by detector circuits viewed generally at 22 and 24 respectively. The road speed detector circuit 22 comprises a diode rectifier 26, a capacitor 28, and a resistor 30 and these components combine so that the voltage at $E_3$ across resistor 30 will have the FIGURE 5 demodulated wave shape.

The road speed detector circuit 22 communicates through a capacitor 32 with an amplifier circuit, denoted generally at 33, comprising a pair of amplifying devices, such as amplifier triodes 34 and 35. In this arrangement the grid of triode 34 is connected to the circuit 22, the cathode grounded at 36, and the plate connected to a source of D.C. voltage (B+).

Figure 7:
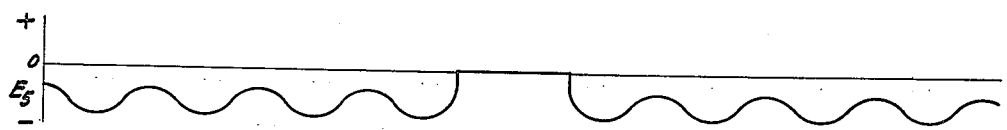
Figure 8:
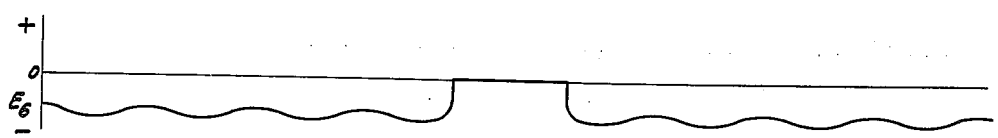

The operation of the command speed detector circuit 24 is similar to the road speed detector circuit 22 and includes a diode rectifier 36, a resistor 38 grounded at 40, and a capacitor 42. This circuit 24 causes a demodulated command speed voltage $E_5$ to be applied to capacitor 42. The wave form of the $E_5$ voltage is illustrated in FIGURE 7, and as indicated, is negative relative to the demodulated road speed signal voltage at $E_3$.

The command speed detector circuit 24 has one output connected through a resistor 44 and a filter capacitor 46 grounded at 48 to the grid of the amplifier triode 34. The filter capacitor 46 and this connection produces a negative grid bias with a D.C. component for the grid of the amplifier triode 34 during the four time intervals mentioned so that the amplifier triode 34 is biased beyond cutoff during this period. Consequently, the road speed signal voltage is not impressed on the amplifier triode 35 during these four time intervals. The other output from the command speed detector circuit 24 extends through a capacitor 50 to the grid of amplifier triode 35 and delivers thereto an A.C. component of the command speed signal voltage. The connection between the plate of the amplifier triode 34 and the grid of the amplifier triode 35 is made through an RC coupling circuit 54 comprising a coupling capacitor 56 and a resistor 58 grounded at 60 and a grid resistor 62. As with the amplifier triode 34, the amplifier triode 35 has the cathode grounded at 64 and the plate joined to a source of D.C. voltage (B+).

The amplifier triode 35 in this embodiment functions as a current limiter so that plate current is always limited to a constant peak amplitude. The plate current curve for amplifier triode 35 is illustrated in FIGURE 10, whereas the plate current curve for amplifier triode 34 is viewed in FIGURE 9. As can be seen, the amplifier triode 35 is so keyed during the four intervals of time, selected as exemplary, that the A.C. component of the command speed signal voltage is transferred and during the other interval, when the amplifier triode 34 becomes conductive, the amplified road speed signal voltage is transferred to the output of the amplifier triode 35.

Because it is necessary that correlation between the amplitudes of the signal voltage waves and frequency thereof be made, a capacitor 66 is installed on the output side of the amplifier triode 35 and grounded at 68. This is because the voltage across such a capacitor will vary in inverse proportion to frequency. Therefore, if the road speed signal voltage and the command speed signal voltage have equal frequencies, the amplitudes of each will be made the same by the capacitor 66. The voltage across the capacitor 66 is designated as $E_7$ and the wave shape thereof is shown in FIGURE 11.

Proceeding along the diagram, the signal voltages will now be impressed on positive and negative clamping circuits designated generally at 70 and 72. Considering first the positive clamping circuit 70, this circuit includes a capacitor 74, a resistor 76 grounded at 78 and a diode 80 connected, as viewed, with the plate towards ground. The function and purpose of the clamping circuit 70 becomes apparent by comparing the zero reference level in FIGURE 12 for the $E_8$ voltage across resistor 76 with the reference level in FIGURE 11 for the $E_7$ voltage. As can be seen, the $E_8$ voltage has been provided by the clamping circuit 70 with a different reference level or potential, and it is this different reference voltage that is to be utilized as a base for the negative clamping circuit 72. A resistor 82 and a capacitor 84 are so arranged with respect to the clamping circuit 70 as to produce a predetermined time constant and cause to be impressed across capacitor 84 at $E_9$ an equivalent D.C. voltage of the voltage at $E_8$. This equivalent D.C. voltage $E_9$ is demonstrated by the FIGURE 13 graph.

The negative clamping circuit 72 comprises a capacitor 86, a resistor 88, and a diode 90. The cathode of the diode 90 has the positive potential applied thereto from the capacitor 84. Similarly to resistor 82 and capacitor 84, a resistor 92 and a capacitor 94 afford a predetermined time constant. Consequently, the FIGURE 14 wave form of the voltage across resistor 88 viewed at $E_{10}$ has the reference of the voltage $E_9$, but is negative. The voltage applied across capacitor 94, denoted at $E_{11}$ and seen in the FIGURE 15 graph, is the D.C. equivalent of the voltage at $E_{10}$. Since, in the example demonstrated by the various graphs, a negative voltage at $E_{11}$ results, then road speed is slower than command speed. The summation of the $E_9$ and $E_{11}$ D.C. output voltages are applied to an appropriate throttle actuating servo 96, and the vehicle throttle opening is increased. As a result, the vehicle road speed is likewise increased until equivalent to the command speed.

To summarize, an example will first be chosen where the road speed and command speed are equal. In other words, the vehicle 12 is traveling along the roadway 10 at 60 m.p.h., the selected command speed. With this presumption, the sequentially demodulated and amplified road speed and command speed signal voltages, because of equivalent frequencies, will have the amplitudes equated by the capacitor 66, as mentioned. Hence, a zero D.C. equivalent voltage will result, being a summation of the $E_9$ and $E_{11}$ voltages. Therefore, the throttle setting will not be changed by the throttle servo 96. If road speed is too slow, then the relationship will be as explained and as depicted in FIGURES 13 and 15. But, if the vehicle is proceeding faster than command speed, the foregoing process will take place and the summation of the $E_9$ and $E_{11}$ will result in a negative voltage that will cause the throttle servo 96 to decrease the throttle opening and accordingly road speed.

It should be mentioned that the throttle servo 96 may be adjusted to hold the throttle in some setting approximating command speed. Then, of course, this setting will be varied in the described way.

From the foregoing it can be seen that by installation of appropriate alternating current sources within a vehicle roadway and by furnishing the vehicle with suitable pickups, signal voltages can be induced that correspond to both actual road speed and some desired command speed. Then, by the utilization of the described circuits, a result in the form of a D.C. output voltage can be obtained and employed to control throttle openings. Consequently, the road speed of the vehicle can be always caused to be equal to, or in some predetermined proportion to, command speed. Since the road speed of the vehicle can be controlled by someone outside the vehicle, speed along selected sections of roadways can be kept at some chosen safe command speed. Also, by obtaining an external command signal, various errors resulting from a so-called built-in command reference are eliminated and calibration is easier.

The invention is to be limited only by the following claims.

I claim:

1. In a device of the class described, the combination of a roadway having plural sources of signal energy therealong, one source being variable so as to produce a command signal corresponding to a desired road speed, another source producing a vehicle road speed signal, a vehicle carried command speed and road speed pickup means, each pickup means being so positioned on the vehicle as to respond to the signal energy from one of the plural sources as the vehicle travels along the roadway and thereby develop signals corresponding, respectively, to the desired vehicle command speed and the actual vehicle road speed, and means responsive to the command speed and road speed signals and adapted so as to cause vehicle movement to be controlled so that the road speed is in some predetermined proportion to the command speed.

2. In combination with a vehicle, a command signal generator developing a command speed signal voltage having a frequency corresponding to a desired road speed, the frequency of the command speed signal voltage being selectively variable remotely of the vehicle, a vehicle road speed generator developing a vehicle road speed signal voltage having a frequency corresponding to actual road speed of the vehicle, the command signal and the road speed generators being positioned also remotely of the vehicle, frequency comparison means responsive to the signal voltages so as to develop a control voltage corresponding in amplitude to the magnitude, respectively, of the difference in frequency between the command speed signal voltage and the vehicle road speed signal voltage, and means responsive to the control voltage and adapted so as to cause vehicle road speed to be controlled in accordance with the control voltage.

3. In combination with a throttle controlled vehicle, a command signal generator developing a command speed signal voltage having a frequency corresponding to a desired speed, the frequency of the command speed signal voltage being selectively variable remotely of the vehicle, a vehicle road speed generator developing a vehicle road speed signal voltage having a frequency corresponding to actual road speed of the vehicle, the command signal and the road speed generators being positioned also remotely of the vehicle, frequency comparison means carried by the vehicle, the frequency comparison means being responsive to the signal voltages so as to develop a control voltage corresponding in amplitude and sense to the magnitude and sense, respectively, of the difference in frequency of the command speed signal voltage and the vehicle road speed signal voltage, and servo means interposed between said frequency comparison circuit and said throttle for regulating the road speed of said vehicle in accordance with said control voltage.

4. In combination with a vehicle, a command signal generator developing a command speed signal voltage having a frequency corresponding to a desired road speed, the frequency of the command speed signal voltage being selectively variable remotely of the vehicle, a vehicle road speed generator developing a vehicle road speed signal voltage having a frequency corresponding to actual road speed of the vehicle, the command signal and the road speed generators being positioned also remotely of the vehicle, a frequency comparison circuit including means causing the amplitudes and the frequencies of the signal voltages to correspond, means developing a control voltage corresponding to the difference in amplitudes of the signal voltages, and means responsive to the control voltage and adapted so as to cause vehicle road speed to be controlled in accordance with the control voltage.

5. A speed control system for a vehicle adapted to travel a roadway, the system comprising a command signal generator developing a carrier wave modulated in amplitude at a frequency corresponding to a desired command speed, a command signal sending transducer connected with the generator and fixed relative to the roadway for transmitting signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low control signal intensity, a command signal receiving transducer carried by the vehicle and arranged so as to have a signal voltage induced therein of a modulated frequency corresponding to that of the carrier wave from the command signal generator, frequency responsive means developing an output voltage corresponding in amplitude to the magnitude of the difference, respectively, in frequency of the command signal voltage and the control signal voltage, and means responsive to the output voltage and adapted so as to cause vehicle movement to be controlled in accordance with the output voltage.

6. A speed control system for a vehicle adapted to travel a roadway, the system comprising a command signal generator developing a carrier wave modulated in amplitude at a frequency corresponding to a desired command speed, a command signal sending transducer connected with the generator and fixed relative to the roadway for transmitting signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low control signal intensity, a command signal receiving transducer carried by the vehicle and arranged so as to have a signal voltage induced therein of a modulated frequency corresponding to that of the carrier wave from the command signal generator, a frequency comparison circuit including means causing the signal voltages to have amplitudes corresponding to frequency and means developing an output voltage corresponding to the differences in the amplitudes of the signal voltages, and means responsive to the output voltage and adapted so as to cause vehicle movement to be controlled in accordance with the output voltage.

7. A speed control system for a vehicle adapted to travel a roadway, the system comprising a command signal generator developing a carrier wave modulated in amplitude at a frequency corresponding to a desired command speed, a command signal sending transducer connected with the generator and fixed relative to the roadway for transmitting signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low control signal intensity, a command signal receiving transducer carried by the vehicle and arranged so as to have a signal voltage induced therein of a modulated frequency corresponding to that of the carrier wave from the command signal generator, amplifier means operative during one period of operation to produce an amplified command signal voltage and during another period of operation to produce an amplified control signal voltage, a frequency comparison circuit including means causing the amplified command and control signal voltages to have amplitudes corresponding to frequency and means comprising clamping circuits of opposite polarity arranged to have the command and control signal voltages applied thereto so as to develop an output voltage corresponding to the amount that the vehicle speed varies relative to the command speed, and means operated by the D.C. output voltage and adapted so as to cause vehicle movement to be controlled in accordance with the output voltage with vehicle speed being caused to be in some predetermined proportion to the command speed.

8. A speed control system for a vehicle adapted to travel a roadway, the system comprising a command signal generator developing a carrier wave modulated in amplitude at a frequency corresponding to a desired command speed, a command signal sending transducer connected with the generator and fixed relative to the roadway for transmitting a signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low control signal intensity, a command signal receiving transducer carried by the vehicle and arranged so as to have a signal voltage induced therein of a modulated frequency corresponding to that of the carrier wave from the command signal generator, detector means demodulating both the command and control signal voltages according to a predetermined scheme, amplifier means operative during one period of operation to produce an amplified command signal voltage and during another period of operation an amplified control signal voltage, a frequency comparison circuit including means causing the command and control signal voltages to have amplitudes corresponding to frequency, and means comprising clamping circuits of opposite polarity arranged to have the command and control signal voltages applied thereto so as to develop an output voltage corresponding to the amount that the vehicle speed varies relative to the command speed, and a throttle actuating servo operated by the output voltage and adapted to alter throttle settings in accordance therewith so as to cause the vehicle speed to be in some predetermined proportion to command speed.

9. A speed control system for a vehicle adapted to travel a roadway, the system comprising a command signal generator developing a carrier wave modulated in amplitude at a frequency corresponding to a desired command speed and keyed so as to be on and off for predetermined intervals, a command signal sending transducer connected with the generator and fixed relative to the roadway for transmitting the signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low signal intensity, a command signal receiving transducer carried by the vehicle and arranged so as to have a signal voltage induced therein of a modulated frequency corresponding to that of the carrier wave from the command signal generator, an amplifier circuit including first and second amplifying devices, the first amplifying device being arranged so as to be biased beyond cutoff during the interval the keyed command signal is on and so as to be conductive during the interval the keyed command signal is off, the first amplifying device when conductive being adapted to amplify the control signal voltage impressed thereon, the second amplifying device being arranged so as to supply an amplified command signal voltage during the interval the keyed command signal is on and the amplified control signal voltage during the interval the keyed command signal is off, a frequency comparison circuit communicating with the output of the second amplifying device and including frequency responsive means adapted to develop command and control signal voltages having amplitudes corresponding to frequency, and means connected to the frequency responsive means and adapted to develop an output voltage corresponding in amplitude and sense to the magnitude and sense, respectively, of the difference in frequency of the command signal voltage and the control signal voltage, control means operated by the output voltage and adapted to control vehicle movement in accordance therewith so as to cause the vehicle speed to be in some predetermined proportion to the command speed.

10. A speed control system for a vehicle adapted to travel a roadway, the system comprising a command signal generator developing a carrier wave modulated in amplitude at a frequency corresponding to a desired command speed and keyed so as to be on and off for predetermined intervals, a command signal sending transducer connected with the generator and fixed relative to the roadway for transmitting the signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low signal intensity, a command signal receiving transducer carried by the vehicle and arranged so as to have a signal voltage induced therein of a modulated frequency corresponding to that of the carrier wave from the command signal generator, command signal and control signal detector circuits for demodulating respectively the command and the control signal voltages according to a predetermined scheme, an amplifier circuit including first and second amplifying devices, the first amplifying device being arranged so as to be biased beyond cutoff by the D.C. component of the demodulated command signal voltage during the interval the keyed command signal is on and so as to be conductive during the interval the keyed command signal is off, the first amplifying device when conductive being adapted to amplify the demodulated control signal voltage impressed thereon, the second amplifying device being arranged so as to supply an amplified command signal voltage during the interval the keyed command signal is on and the amplified control signal voltage during the interval the keyed command signal is off, frequency comparison circuit communicating with the output of the second amplifying device and including a frequency responsive circuit adapted to develop command and control signal voltages having amplitudes corresponding to frequency and clamping circuits of opposite polarity connected to the frequency responsive circuit and adapted to develop a D.C. output voltage corresponding in amplitude and sense to the magnitude and sense, respectively, of the difference in frequency of the command signal voltage and the control signal voltage, and control means operated by the D.C. output voltage and adapted to control vehicle movement in accordance therewith so as to cause the vehicle speed to be in some predetermined proportion to the command speed.

11. A speed control system for a vehicle adapted to travel a roadway, the system comprising a command signal generator developing a carrier wave modulated in amplitude at a frequency corresponding to a desired command speed and keyed so as to be on and off for predetermined intervals, a command signal sending transducer connected with the generator and fixed relative to the roadway for transmitting the signal energy therealong, a control signal generator developing an unmodulated carrier wave, a control signal sending transducer connected with the control signal generator and providing alternate zones of high and low control signal intensity along the roadway, a control signal receiving transducer carried by the vehicle and arranged so as to have a signal voltage induced therein modulated in amplitude at a frequency corresponding to the rate at which the control signal receiving transducer passes through the zones of high and low signal intensity, a command signal receiving transducer carried by the vehicle and arranged so as to have a signal voltage induced therein of a modulated frequency corresponding to that of the carrier wave from the command signal generator, command signal and control signal detector circuits for demodulating respectively the command and the control signal voltages according to a predetermined scheme, an amplifier circuit including first and second amplifying devices, the first amplifying device being arranged so as to be biased beyond cutoff by the D.C. component of the demodulated command signal voltage during the interval the keyed command signal is on and so as to be conductive during the interval the keyed command signal is off, the first amplifying device when conductive being adapted to amplify the demodulated control signal voltage impressed thereon, the second amplifying device being arranged so as to supply an amplified command signal voltage during the interval the keyed command signal is on and a further amplified control signal voltage during the interval the keyed command signal is off, a frequency comparison circuit communicating with the output of the second amplifying device and including a frequency responsive circuit adapted to develop command and control signal voltages having amplitudes corresponding to frequency and clamping circuits of opposite polarity connected to the frequency responsive circuit, one clamping circuit establishing a reference base for the other, and time constant circuits coacting with the clamping circuits so as to develop a D.C. output voltage corresponding in amplitude and sense to the magnitude and sense, respectively, of the difference in frequency of the command signal voltage and the control signal voltage, and a throttle actuating servo operated by the D.C. output voltage and adapted to alter throttle settings in accordance therewith so as to cause the vehicle speed to be in some predetermined proportion to command speed.

12. In a device of the character described, the combination of a roadway having associated therewith plural sources of signal energy including a source of command speed signal energy and a source of road speed signal energy, the plural sources being so arranged relative to the roadway as to cause the signal energy to emanate from the roadway, a vehicle carried command speed pickup means and a vehicle carried road speed pickup means respectively responsive to the signal energy from the command speed and road speed signal energy sources so as to provide both a command speed signal voltage having a frequency corresponding to desired speed and a vehicle road speed signal voltage having a frequency corresponding to actual vehicle road speed, frequency comparison means coacting with both the command speed and road speed pickup means so as to develop a control voltage corresponding in amplitude and magnitude respectively to the difference between the frequency of the command speed signal and the vehicle road speed signal voltages, and means responsive to the control voltage and adapted so as to cause vehicle road speed to be controlled in accordance with the control voltage.

13. In a device of the character described, the combination of a roadway having associated therewith plural sources of signal energy, the plural sources being so arranged relative to the roadway as to cause the signal energy to emanate from the roadway, one source of signal energy being selectively variable so as to produce a command signal corresponding to a desired command speed, another source of signal energy being arranged to afford a road speed signal, a vehicle carried command speed and road speed pickup means each responsive to the signal energy from its associated source so as to provide respectively a command speed signal having a frequency corresponding to desired speed and a vehicle road speed signal having a frequency corresponding to actual vehicle road speed, frequency comparison means coacting with both the command speed and vehicle speed pickup means so as to develop a control signal corresponding in amplitude and sense to the magnitude and sense respectively of the difference between the frequency of the command speed signal and the vehicle road speed signals, and means responsive to the control signal and adapted so as to cause the vehicle road speed to be controlled in accordance with the control voltage.

14. In a device of the character described, the combination of a roadway having associated therewith plural sources of signal energy, one source of signal energy being selectively variable remotely of the vehicle so as to produce a command signal of a frequency corresponding to a desired command speed, another source of signal energy producing alternate zones of high and low control signal intensity along the roadway, control signal pickup means carried by the vehicle and arranged so as to have a signal voltage induced therein modulated in amplitude at a frequency corresponding to the rate at which the control signal pickup means passes through the alternate zones of high and low control signal intensity, command signal pickup means carried by the vehicle and arranged so as to have a signal voltage induced therein of a frequency corresponding to that of said one source of signal energy, frequency responsive means developing an output voltage corresponding in amplitude to the magnitude of the difference respectively between the frequency of the command signal voltage and the control signal voltage, and means responsive to the output voltage and adapted to cause a vehicle movement to be controlled in accordance with the output voltage.

References Cited in the file of this patent

UNITED STATES PATENTS

| | | |
|---|---|---|
| 1,767,609 | Murray | June 24, 1930 |
| 2,493,755 | Ferrill | Jan. 10, 1950 |
| 2,576,424 | Sunstein | Nov. 27, 1951 |
| 2,661,070 | Ferrill | Dec. 1, 1953 |
| 2,803,743 | Ballerait | Aug. 20, 1957 |